United States Patent [19]

Pratt

[11] 4,030,960
[45] June 21, 1977

[54] PNEUMATIC SEALING WHEEL

[75] Inventor: Robert H. Pratt, Milwaukee, Wis.

[73] Assignee: Pratt Manufacturing Corporation, Milwaukee, Wis.

[22] Filed: Sept. 19, 1975

[21] Appl. No.: 615,132

[52] U.S. Cl. .......................... 156/555; 93/DIG. 1; 100/176; 100/211; 156/582; 156/583
[51] Int. Cl.² ..................... B30B 3/04; B30B 15/34
[58] Field of Search .......... 156/555, 582, 571, 553, 156/358, 583; 241/102; 100/210, 211, 163, 164, 165, 176, 93 RP, 160; 93/DIG. 1; 68/256; 53/178, 185

[56] References Cited

UNITED STATES PATENTS

| 2,582,872 | 1/1952 | Krengel | 241/102 |
|---|---|---|---|
| 2,589,603 | 3/1952 | Cohen | 241/102 |
| 3,222,059 | 12/1965 | Southcott | 156/571 |
| 3,383,884 | 5/1968 | Meyer | 100/211 |
| 3,540,664 | 11/1970 | Adams | 241/102 |
| 3,603,122 | 9/1971 | Sulzmann | 100/211 |

Primary Examiner—Charles E. Van Horn
Assistant Examiner—M. G. Wityshyn
Attorney, Agent, or Firm—Wheeler, Morsell, House & Fuller

[57] ABSTRACT

A sealing wheel has a pneumatic tire with means whereby the flexure of the tire may be altered to compensate for dimensional differences in associated parts so that a required sealing pressure may be maintained. In one embodiment, a plurality of sealing wheels are mounted on a common shaft, the tire of each wheel being coupled with a source of compressed air, the air line for each tire having a pressure regulator so that the several tires may be regulated independently of each other, or coupled with a common source so that all tires may be regulated together. In one embodiment of the invention there may be a partial filling of the tire with liquid of a type which will bring about a more even distribution of heat where there is heat sealing.

2 Claims, 6 Drawing Figures

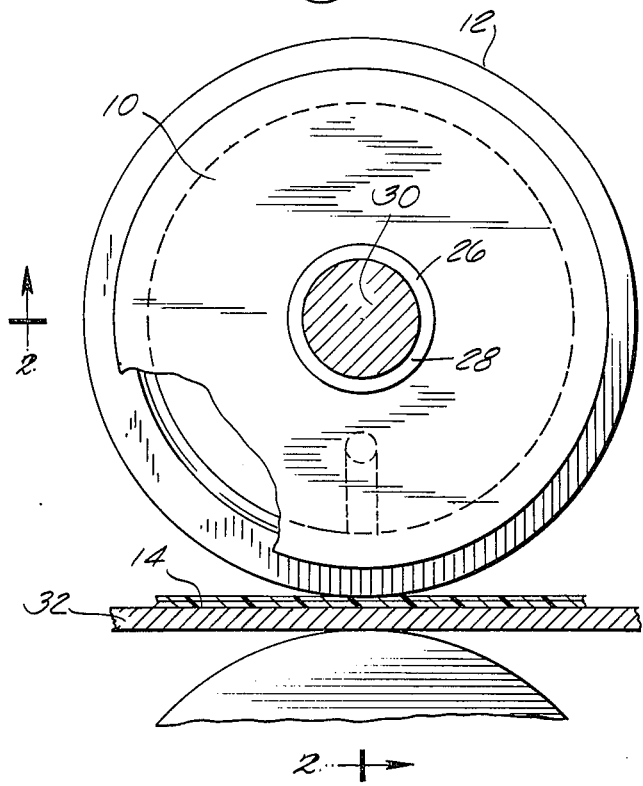
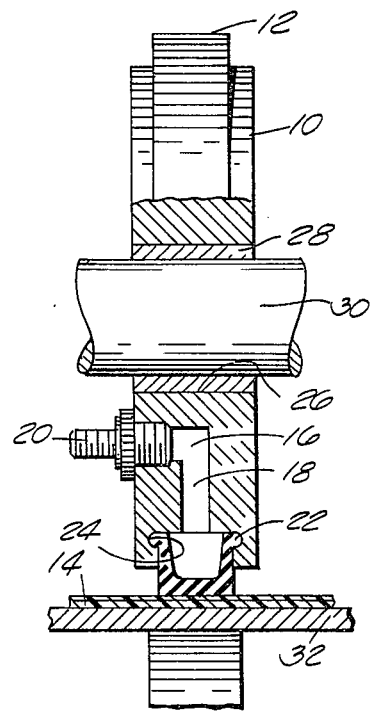
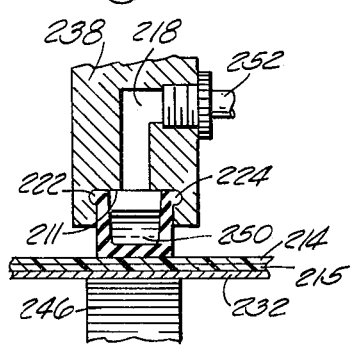
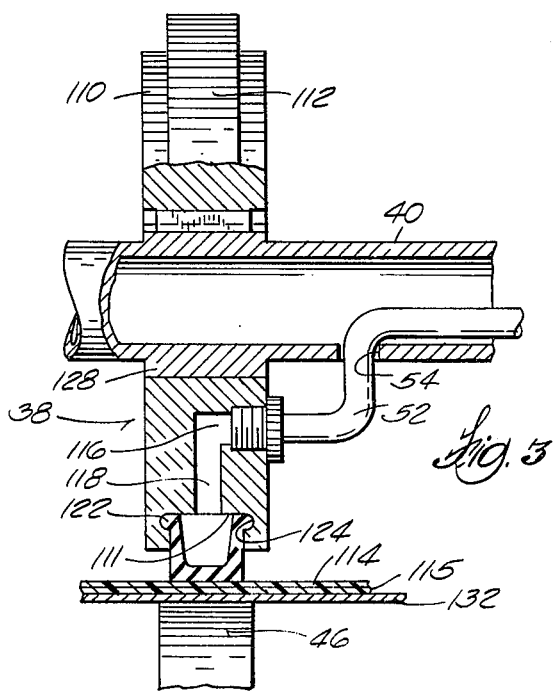

PNEUMATIC SEALING WHEEL

BACKGROUND OF THE INVENTION

This invention relates to sealing wheels for webs of sheet material such as used in packaging machines to seal the margins of superimposed travelling webs which are to form packages. In the past, such sealing wheels have in some cases been mounted in opposed pairs above and below the sheet material to be sealed, and have been arranged to exert a suitable sealing pressure. In some cases, one or more of the wheels has been heated to provide a heat seal and, in other cases, pressure sensitive adhesive has been used. This required air pressure but not heat. In both cases, difficulty has been encountered due to minor abnormalities in the position and/or dimensions of one or both sealing wheels. For example, the shaft supporting one of the sealing wheels might bow slightly to cause one wheel to be slightly farther away from the work than the others. This may occur when several axially spaced sealing wheels are supported on the same shaft. Also, the periphery of one or more of the sealing wheels might be sufficiently eccentric to cause intermittent interruption or minor reduction in the sealing pressure along the line of seal, thus affecting the critical pressure-temperature-time relationship. Since a dimensional or positional abnormality as small as 0.001 inches can cause a defective seal, this presents a serious problem in packages used for the health industry or for food or anhydrous materials, as openings which might admit contaminating foreign matter, air or moisture would seriously affect the sterility, condition or usability of the contents.

SUMMARY OF THE INVENTION

In accordance with this invention, the above noted problem is solved by providing a pneumatic tire or tube on the sealing wheel or on the back-up wheel of a pair of sealing wheels, the pressure in the tire or tube controllings its flex to compensate for minor abnormalities in the position or dimenions of the sealing wheel similarly to the way a truck tire adjusts for road abnormalities. In one embodiment of the invention where there is a heat sealing wheel the tire on the back-up wheel may be partially filled with liquid of a type which will being about a more even distribution of heat.

DESCRIPTION OF THE DRAWINGS

FIG. 1 is a side elevational view of one embodiment of the invention showing the sealing wheel pressing against webs of sheet material.

FIG. 2 is a sectional view taken on the line 2—2 of FIG. 1.

FIG. 3 is a similar sectional view of a second embodiment of the invention.

FIG. 6 is a fragmentary view similar to a portion of FIG. 2, showing a modification.

DESCRIPTION OF THE PREFERRED EMBODIMENTS

Figure 4:
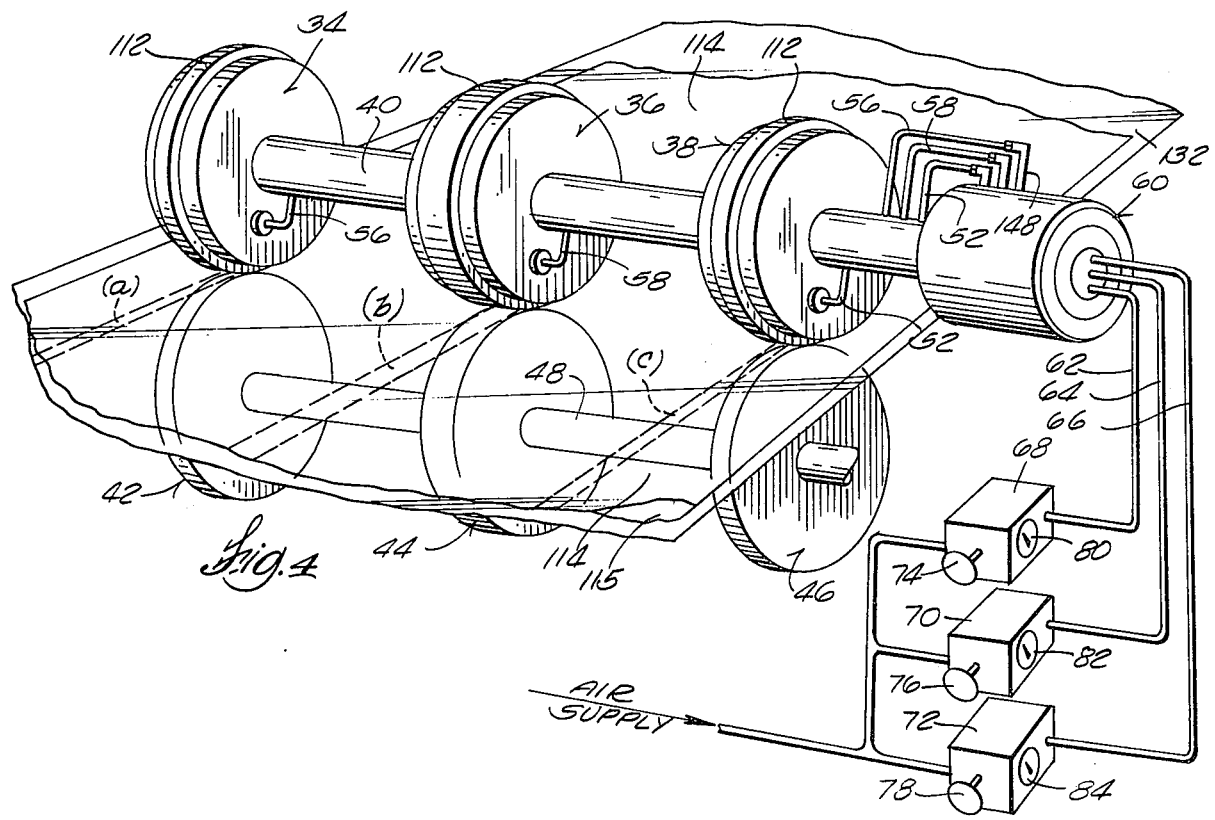
FIG. 4 is a diagrammatic perspective view showing three of the sealing wheels of FIG. 3 mounted on a common shaft and coupled through a rotary coupling to three separate air lines each having a pressure regulator.

FIGS. 1 and 2 show one embodiment of the invention wherein the metal wheel 10 is peripherally grooved as illustrated to receive a pneumatic tire or tube 12 for applying sealing pressure in a strip along webs of sheet material 14. Tire 12 is made of a suitable resilient material such as rubber or like synthetic material, and is adapted to receive air under pressure through communicating bores 16 and 18 in wheel 10 and through a standard tire valve 20 which is attached within bore 16 by matching screw threads. Tire 12 has outwardly-projecting beads 22 near its inner periphery which seat in matching outwardly-projecting grooves 24. The air pressure within tire 12 presses beads 22 into grooves 24 to seal tire 12 and help hold it in place within peripheral groove 11.

Wheel 10 has a central bore 26 within which a bronze bushing 28 is press fitted. Wheel 10 and bushing 28 may rotate freely on a shaft 30 which is supported by conventional means (not shown) in such a position that the tire presses against the webs of sheet material 14. Sheet material 14 may be supported by a moving surface 32 which can be a portion of an endless belt or any other suitable support surface. One or both of the adjacent faces of the web of sheet material 14 may, in this example, be coated with pressure sensitive adhesive in a strip positioned to be engaged by the tire 12 so that the two webs of material 14 can be sealed together. Where pressure sensitive adhesive is employed, no heat is needed.

FIGS. 3 and 4 show a second embodiment of the invention in which three sealing wheels 34, 36 and 38 (FIG. 4) are mounted rigidly on a common rotatable shaft 40 to coact with three anvil wheels 42, 44 and 46 which are mounted on a common shaft 48. Shafts 40 and 48 are suitably supported on conventional supporting framework which is not shown in the drawings.

Two webs of packaging material 114 and 115 (FIG. 4) travel between the sealing wheels 34–38 and anvil wheels 42–46 to seal the webs 114 and 115 along three strips (a), (b) and (c), the center strip (b) in this instance being wider than the outer strips. The arrangement shown in FIG. 4 is used in a packaging machine in which items are inserted between webs of packaging material 114 and 115, which are then sealed both longitudinally on the lines (a), (b) and (c) and also transversely along lines not shown, and are then cut intermediate the width of central seal (b) and also along the transverse seals to separate the individual packages. However, the means for cutting the webs 114 and 115 into individual packages is not pertinent to this invention and is, therefore, not disclosed in the drawings.

When the sealing wheels 34–38 and anvil wheels 42–46 are mounted in spaced relationship on shafts such as the shafts 40 and 48, one or both of the shafts may bow slightly so that the seaing pressure exerted by some wheels may vary from that exerted by other wheels. Also, it is possible, due to manufacturing imperfections or for other reasons that certain wheels may be slightly out of round by differing amounts. To minimize the sealing pressure variations in response to these abnormalities, a pneumatic tire 112 is mounted on each of the back-up sealing wheels 34–38, each pneumatic tire being connected to a separate compressed air line. Each of such lines may have its own pressure regulator as described hereinafer, or, alternatively, there may be a common source of compressed air with a single regulator instead of the three shown in FIG. 4.

FIG. 3 shown the pneumatic tire 112 for back-up sealing wheel 38, which is similar in construction to the sealing wheel shown in FIGS. 1 and 2 and has the same reference numbers increased by 100 for similar parts. Sealing wheel 38 differs from the previously described sealing wheel of FIG. 1 in having a compressed air conduit 52 communicating with bore 116 and extending through hollow interior 54 of shaft 40. Sealing wheels 34–38 are slidably though rigidly attached to hollow shaft 40 and rotate therewith.

Figure 5:
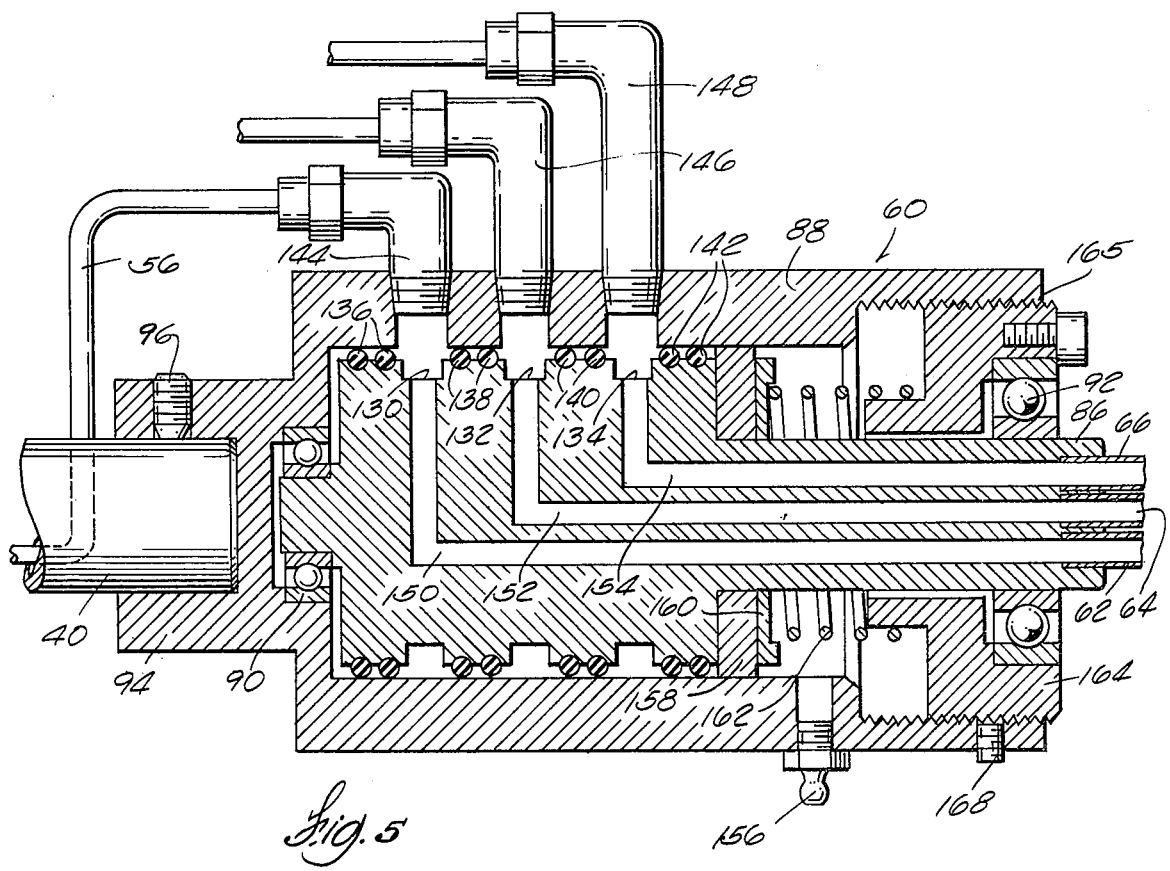
FIG. 5 is a longitudinal sectional view of the rotary coupling used in the assemblage of FIG. 4.

In the embodiment illustrated in FIG. 5, the pneumatic tire for each of the back-up sealing wheels 34–38 is coupled via conduits 52, 56 and 58 through the hollow interior of shaft 40 to a three-way rotaty coupling 60, and from coupling 60 via conduits 62, 64 and 66 to independent pressure regulators 68, 70 and 72, each of which is coupled to a conventional source of air under pressure. Pressure regulators 68–72 have manual adjustments 74, 76 and 78 and pressure gauges 80, 82 and 84. Each manual adjustment 74–78 is set to maintain the air pressure level desired for the corresponding tire of sealing wheel 34–38, as indicated on pressure gauges 80–84. The pressure regulators 68–72 thereafter hold the pessure in the pneumatic tires of sealing wheels 34–38 within a predetermined tolerance of the selected pressure levels. The independent pressure regulators and adjustmenst make it possible for each pneumatic tire to be maintained at a different pressure level if necessary to compensate for bowing of shafts 40 or 48 or other abnormalities, but, as before mentioned, a common source of compressed air with a single regulator may be alternatively used.

FIG. 5 is a longitudinal sectional view of rotary coupling 60, which includes a core 86 which is mounted within a casing 88, there being bearing 90 and 92. Casing 88 has a hub 94 at one end which receives an end of shaft 40 and is rigidly secured thereto be set screw 96. Casing 88 rotates with shaft 40 while core 86 remains stationary. Core 86 contains three annular air ducts 130, 132 and 134 which are sealed from each other and from the ambient air by O-rings 136–142. Conduits 52, 56 and 58 communicate with grooves 130-134 via elbow fittings 144, 146 and 148. Conduits 62–66 communicate with ducts 130–134 by way of ducts 150, 152 and 154 in core 86. As casing 88 rotates, conduits 52, 56 and 58 are continuously coupled to conduits 62, 64 and 66 though ducts 130–134 and 150–154.

Core 86 in FIG. 5 may be lubricated by grease introduced through a grease fitting 156. There is also a packing 158 which is supported by a metal washer 160, a spring 162 between washer 160, and a nut 164 within the end of casing 88, there being a set screw 168.

In the apparatus of FIG. 4, the web material 114 and 115 is drawn between back-up sealing wheels 34–38 and anvil wheels 42–46 by suitable means such as an endless belt 132. Anvil wheels 42–46 can be heated by conventional means not shown to effect a heat seal when a heat seal is required. Whether or not heat sealing is required, the pneumatic tires on sealing wheels 34–38 compensate for positional and dimensional abnormalities, and hold the sealing pressure relatively constant. This produces relatively uniform seals in spite of shaft bowing, out-of-round wheels, or other abnormalities.

In certain situations, particularly when there is heat sealing, it may be desirable to partially fill the tire with a liquid as at 250 in FIG. 6. In this view like parts to those of FIG. 3 are designated by the same numerals preceded by a 2. The liquid is of a type which will bring about a more even distribution of heat when there is heat sealing. The liquid could be high temperature oil, water, a viscous medium or a metallic liquid such as mercury, for example. Air pressure from the duct 218 will also be used in the tire so that there is controllable air pressure, just as in the forms of the invention of FIGS. 1 and 3, but the pressure of the liquid will cause more even heat transfer.

In use, when the tires are pressed against the web materials, the tires are compressed slightly but, because of the pneumatic pressure, provide play in both directions with regard to dimensional abnormalities. If a sealing wheel has a flat spot, the tire may expand slightly to maintain sealing pressure as the flat spot passes over the web. The same is true if the shaft bows away from the web. If the sealing wheel has a bump, or if the shaft is displaced toward the web, the tire may compress slightly. The air valve of FIG. 2 provides for maintenacnce of a suitable pressure for particular conditions. In the form of invention of FIGS. 4 and 5, the pressure regulators automatically maintain suitable pressure for each tire independently of the others.

Various changes and modifications may be made without departing from the spirit of the invention, and all of such changes are contemplated as may come within the scope of the claims.

What I claim is:

1. In a packing machine for processing superimposed webs of material which are to be sealed together along at least three laterally spaced lines extending longitudinally of the web, having anvil wheels one for each of said sealing lines, having laterally spaced sealing wheels one above each anvil wheel positioned to coact with the anvil wheels in exerting sealing pressure on the webs of material, and having a common shaft for said sealing wheels, the improvement comprising a pneumatic tire on each sealing wheel, and means providing for changes in the pneumatic pressure of each tire to compensate for dimensional or positional abnormatlities and insure the exertion of proper sealing pressure by each wheel on said webs relative to the other wheel, said means for providing for changes in the pneumatic pressure in each tire including air ducts in said shaft, a duct in each wheel communicating at one end with an air duct in said shaft and at its other end with the interior of its tire, and means for independently introducing air under pressure into each of the ducts of said shaft.

2. A packaging machine as claimed in claim 1 wherein said means for introducing air under pressure into said ducts of the shaft includes a rotary coupling, a separate air line for delivering compressed air through said rotary coupling to the duct for each wheel, and a pressure regulator for each separate air line.

* * * * *